Oct. 25, 1932.    F. STONER    1,884,907
INDUSTRIAL TRUCK
Filed March 6, 1928    6 Sheets-Sheet 1

By Frank Stoner
Geo. B. Pitts
Attorney

Oct. 25, 1932.  F. STONER  1,884,907
INDUSTRIAL TRUCK
Filed March 6, 1928  6 Sheets-Sheet 2
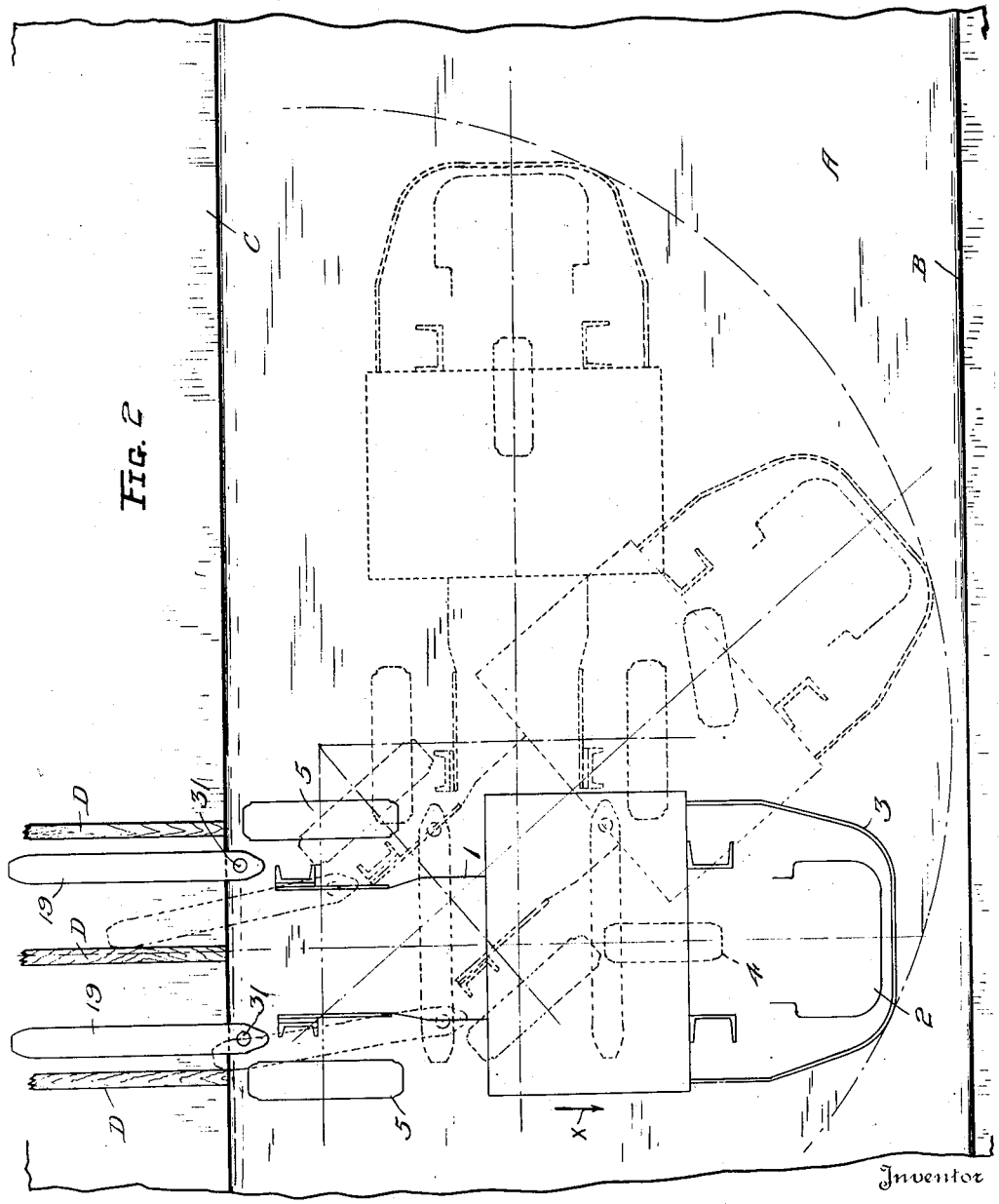

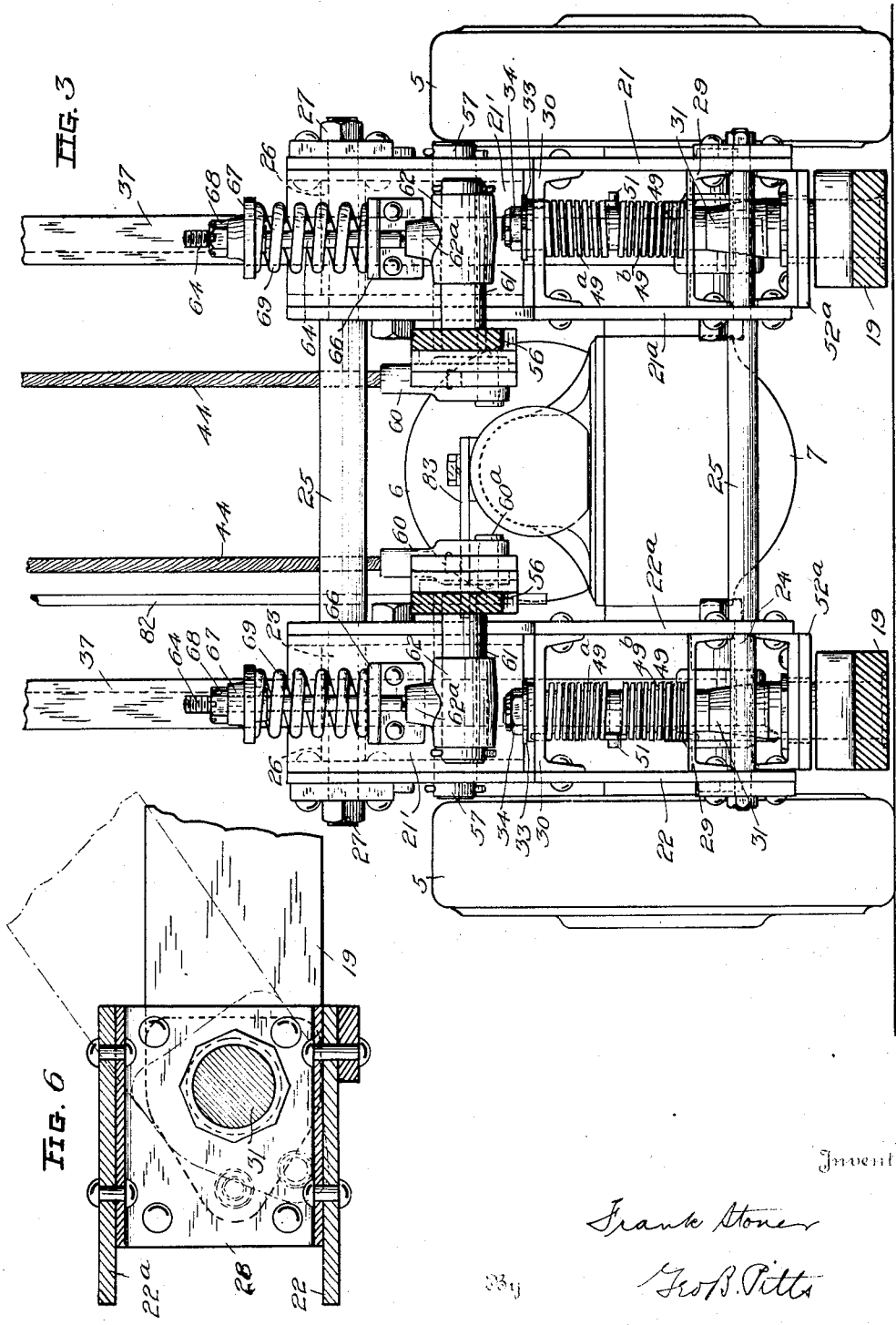

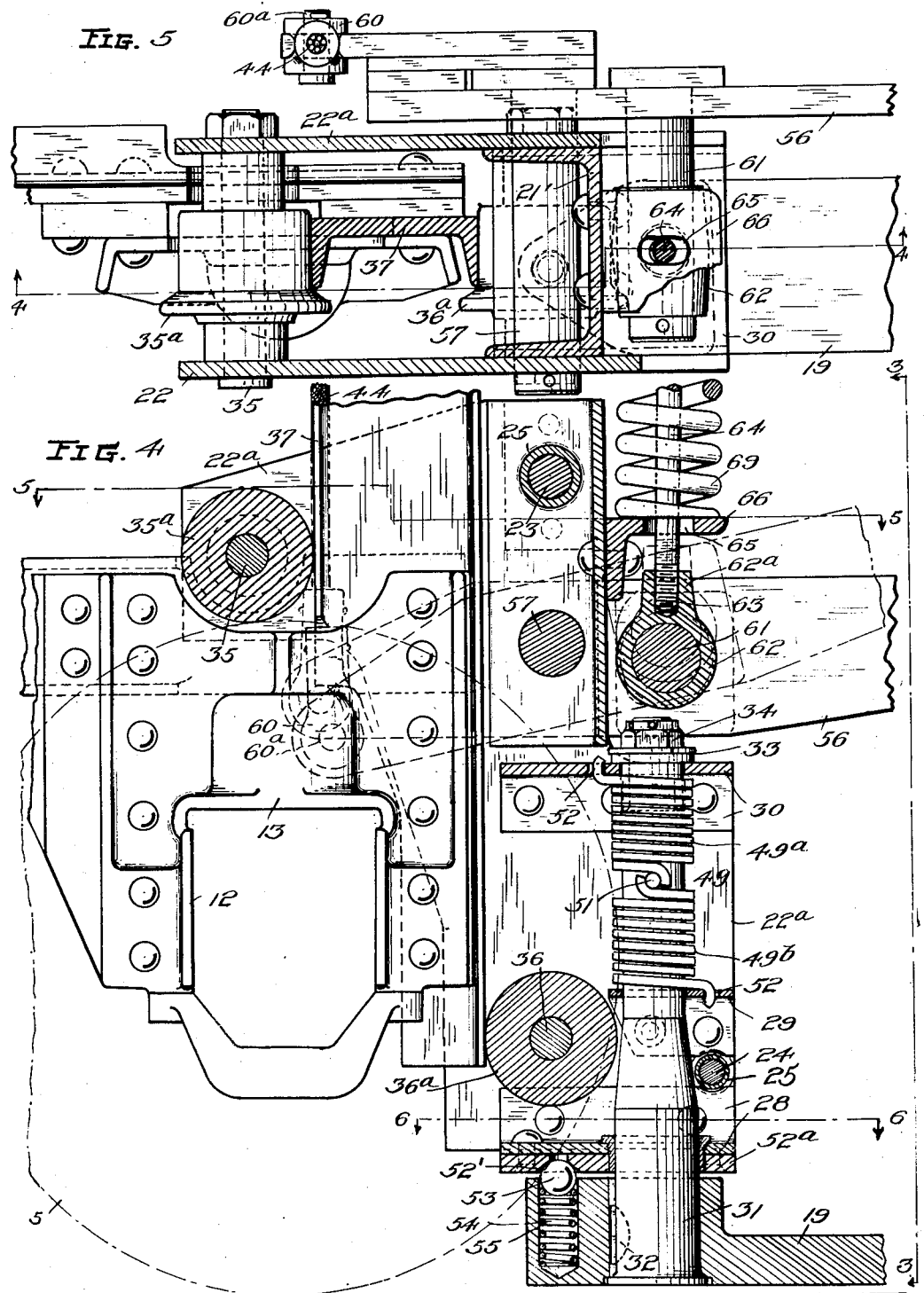

Oct. 25, 1932.  F. STONER  1,884,907
INDUSTRIAL TRUCK
Filed March 6, 1928   6 Sheets-Sheet 5
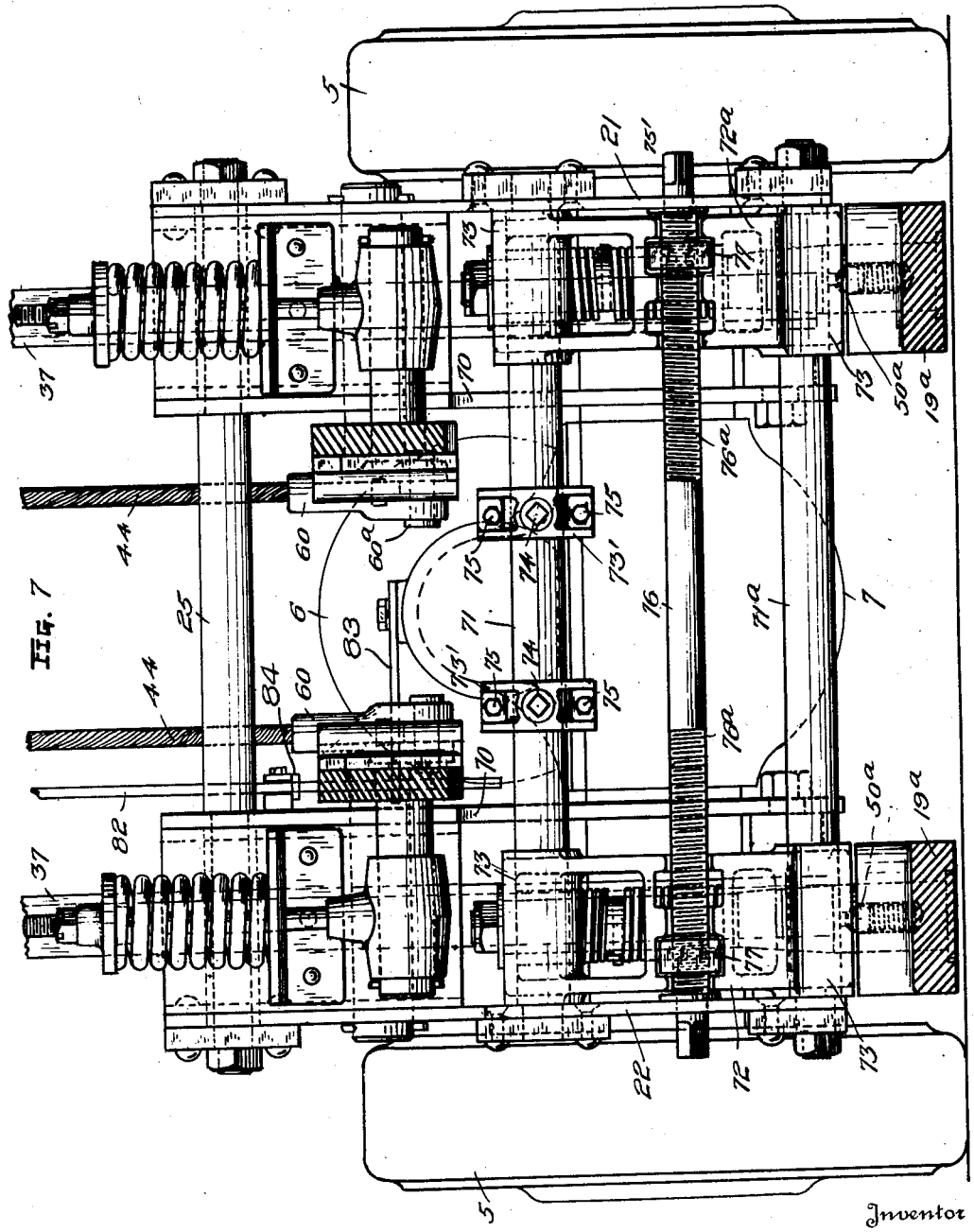
Inventor
Frank Stoner
By Geo. B. Pitts
Attorney Oct. 25, 1932.  F. STONER  1,884,907
INDUSTRIAL TRUCK
Filed March 6, 1928  6 Sheets-Sheet 6
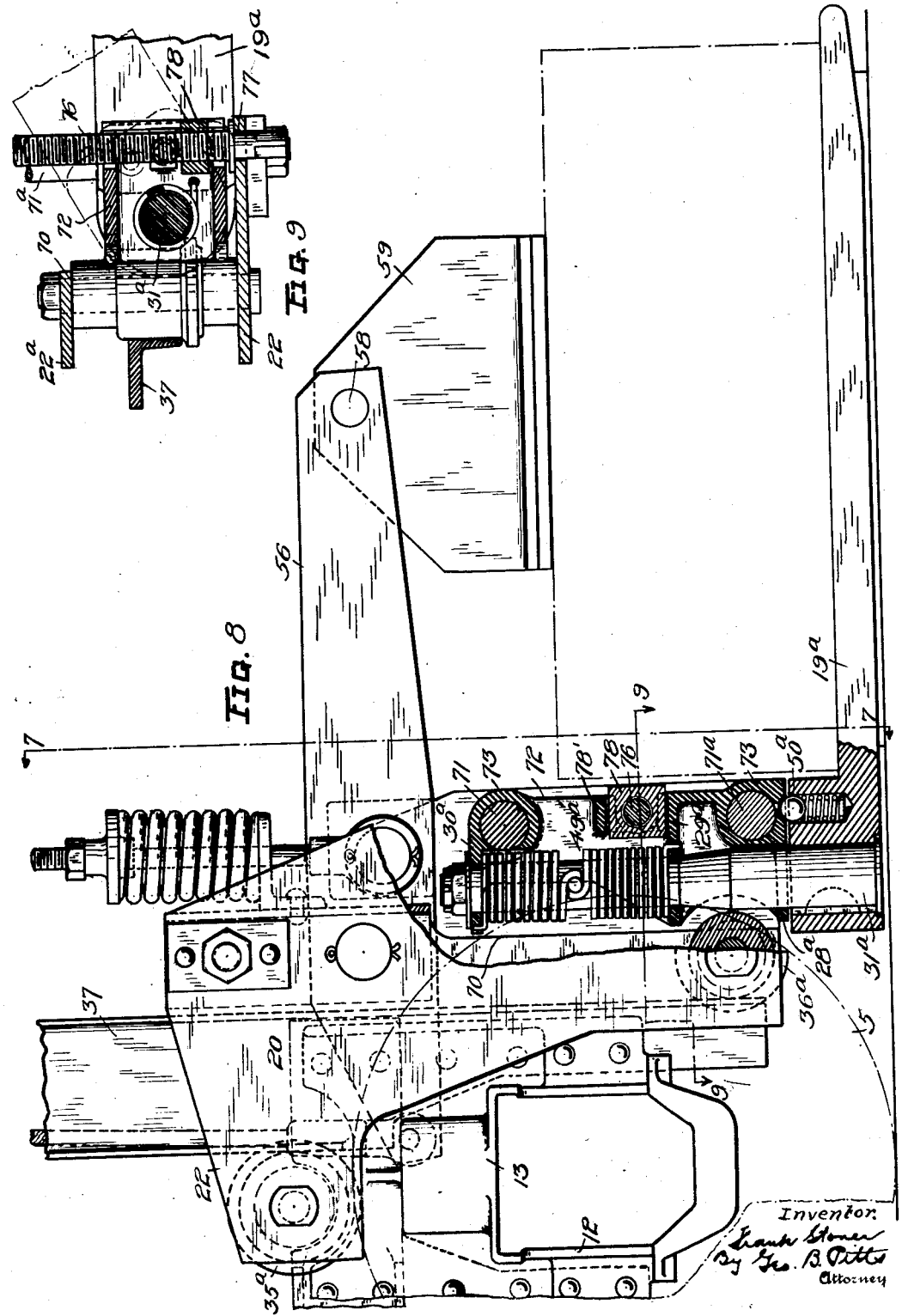

Patented Oct. 25, 1932

1,884,907

UNITED STATES PATENT OFFICE

FRANK STONER, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed March 6, 1928. Serial No. 259,535.

This invention relates to an industrial truck.

One object of the invention is to provide a truck of this character capable of operating in relatively small areas or under conditions where trucks of the usual form of construction cannot be manipulated.

Another object of the invention is to provide a truck having a load lifting member the load carrying devices or portions of which are movable to facilitate the operation of the truck in handling loads.

A further object of the invention is to provide a truck having projecting load carrying devices capable of movement laterally in their planes to enable the truck to be operated and steered or turned in a relatively small area.

A further object is to provide a truck having projecting load carrying devices capable of adjustment toward and from each other dependent upon the width of the load or the spacing of the dunnage therefor.

Other objects of the invention will be apparent to those skilled in the art to which my invention relates from the following description taken in connection with the accompanying drawings, wherein Fig. 1 is a side elevation of a truck embodying my invention, parts being broken away.

Fig. 2 is a plan view of an aisle or driveway having a dock or platform and showing diagrammatically how a truck embodying my invention is adapted to operate upon the discharge of a load in such space or area.

Fig. 3 is a fragmentary end view of parts shown in Fig. 1 looking toward the left.

Fig. 4 is a fragmentary section on the line 4—4 of Fig. 5.

Fig. 5 is a section on the line 5—5 of Fig. 4.

Fig. 6 is a section on the line 6—6 of Fig. 4.

Fig. 7 is a fragmentary front view of a truck embodying my invention but embodying a slightly different form of construction; this view being taken on the line 7—7 of Fig. 8.

Fig. 8 is a fragmentary view, partly in elevation and partly in section of the parts shown in Fig. 7.

Fig. 9 is a section on the line 9—9 of Fig. 8.

Figure 1:
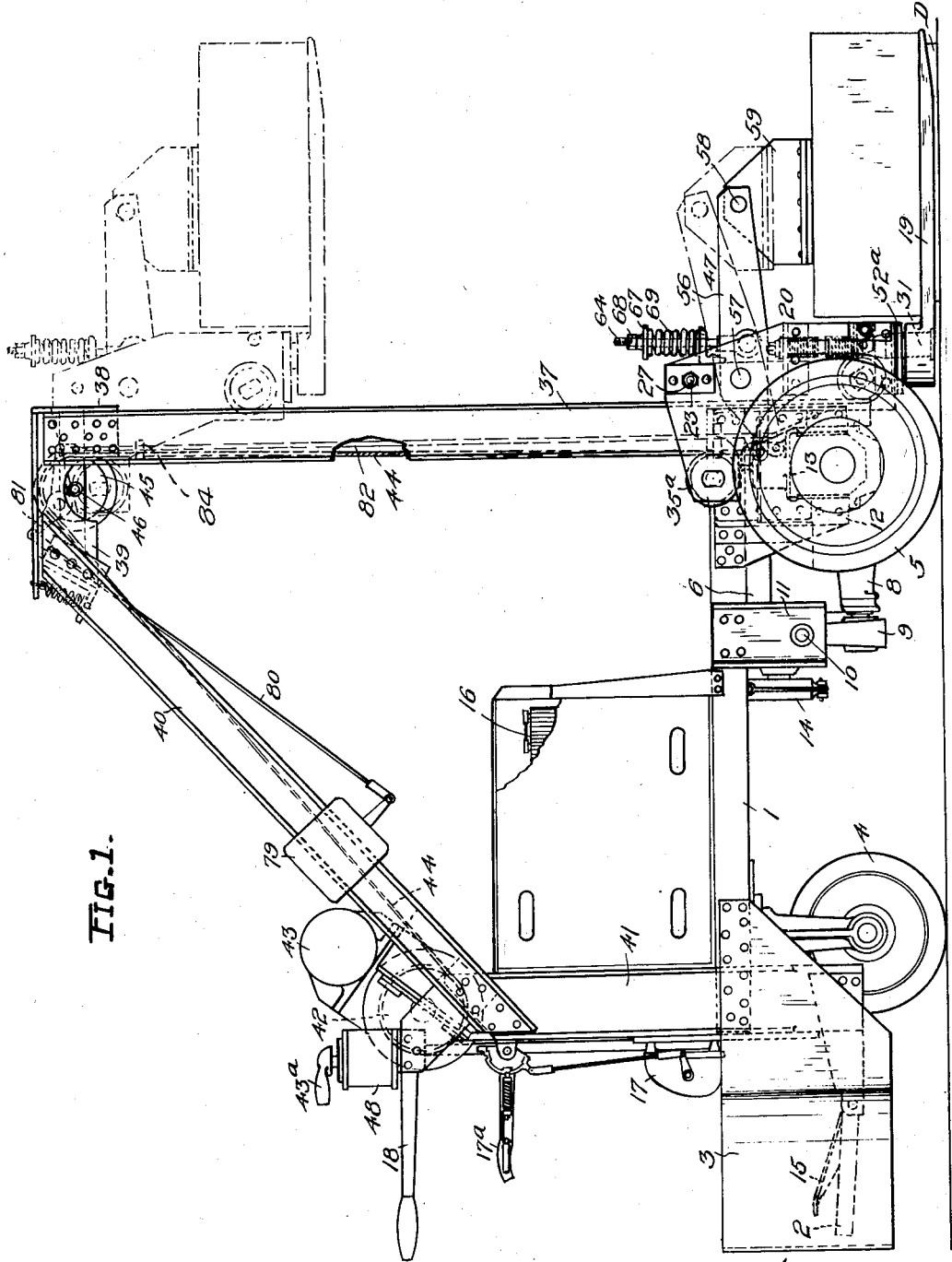

In the drawings, 1 indicates a suitable frame mounted on a plurality of wheels, certain or all of which may be steerable and provided with a suitable platform 2 for the operative to stand on. This platform is shown enclosed by a guard 3 to protect the operative and projecting parts when the truck is being manipulated in restricted spaces, one example of which is shown in Fig. 2.

In the illustrated form of construction, I have shown one steerable wheel 4 at the front end of the frame 1 and a pair of traction wheels 5 at the opposite end thereof. The wheels 5 are driven by an electric motor 6 through a suitable power transmitting mechanism enclosed in the housing 7 (see Fig. 3). The housing 7 has an extended portion 8 forming a cradle for the motor. The extended portion 8 is connected by a ball and socket joint to the center portion of a torque member 9, the opposite ends of which are pivoted at 10 to brackets 11 (only one being shown) depending from the frame 1. The axle housings at either side of the housing 7 are mounted in boxes 12, which have inverted cups 13 for coiled springs arranged to engage the axle housings. The inner end of the motor shaft carries a brake wheel with which brake shoes 14 engage, the latter being normally biased into engagement therewith by a spring not shown. The brake shoes are released and controlled by a foot pedal 15.

16 indicates the batteries for supplying current to the motor 6.

17 indicates a suitable controller, operated by a handle 17a in a well known manner to drive the motor 6 in either direction. 18 indicates a device, such as a lever, operatively connected with the wheel 4 to effect steering thereof whereby the truck may be driven from place to place and manipulated to engage a load or discharge it.

19 indicates a plurality of load carrying devices (two being shown in the drawings) projecting outwardly and mounted at their inner portions so as to swing about vertical axes for purposes which will later appear. The devices 19 preferably form part of or are connected to an elevating member, indicated as an entirety at 20, whereby the load carrying devices may be (a) lowered to engage a load and then lifted for transportation thereof and then lowered to discharge or release the load on the floor or a deck or platform and (b) operated for piling or tiering loads and similar operations. Referring to Figs. 1 to 7, inclusive, the elevating member 20 may comprise pairs of plates 21—21a, 22—22a, suitably connected in rigid, spaced relation by rods 23, 24, disposed near the upper and lower portions of the plates and having sleeves 25 interposed between the inner plates 21a, 22a, the rod 23 having sleeves 26 between each pair of plates 21—21a and 22—22a. The opposite ends of each rod 23, 24, carries nuts 27 to clamp the parts together.

The upper portions of each pair of plates 21—21a, 22—22a, are also rigidly connected in spaced relation by a section of channel bar 21′, preferably disposed vertically and the lower portions of each pair of plates 21—21a, 22—22a, are rigidly connected and spaced by a plurality of sections of channel bars 28, 29, 30, preferably disposed horizontally, these several sections being suitably riveted to the plates. The bars 28, 29, 30, are formed with aligned openings in which is rotatably mounted a shaft 31. The lower end of the shaft 31 is connected to the inner end of one of the load carrying devices 19, as by a key 32. The upper end of each shaft 31 carries a collar 33 bearing upon the upper face of the section 30 and this collar is held in position by a nut 34 threaded on the free end of the shaft.

Each pair of plates 21—21a, 22—22a, supports at its upper and lower portions shafts 35, 36, on which are loosely mounted suitable rollers 35a, 36a, respectively, having rolling engagement with a guide 37.

In the illustrated form of construction the guides 37 comprise channels and are rigidly connected at their lower ends to the frame 1 and boxes 12. At their upper ends, the guides are connected by a plate 38 and provided with inwardly extending brackets 39, which in turn are connected by the members 40 to uprights 41.

The elevating member 20 is raised and lowered by a suitable hoisting mechanism preferably comprising a pair of drums (one being shown at 42) driven by an electric motor 43, which is supplied with current from the batteries 16, and flexible members such as cables 44 which reeve over and around sheaves 45. The sheaves 45 are loosely mounted on a shaft 46 carried by the brackets 39. The free ends of the cables 44 may be directly connected to the elevating member 20, but in the preferred arrangement they operate through a load clamping mechanism, indicated as an entirety at 47, whereby the pull on the cables to lift a load may be utilized to clamp it to the devices 19, as will later appear.

48 indicates a controller for cutting in and out current from the batteries 16 to the motor 43, the controller being operated by a handle 43a.

The load carrying devices 19 project in the plane of or a plane parallel to the truck frame under ordinary circumstances and are swingable laterally in their planes in either direction as shown in Fig. 6, and they may be arranged at an angle where the load to be engaged is so located that the truck cannot be driven in its longitudinal plane to engage or discharge the load. But in the preferred form of construction I provide means, indicated as an entirety at 49, for returning each of the devices 19 to the mid-position after being moved laterally in either direction, and in addition thereto I prefer to provide a spring actuated locking means, indicated as an entirety at 50, which prevents swinging movement of each device 19 from its mid-position except when a substantial force, as that resulting from its engagement with an obstruction, is applied to it.

The return means 49 may comprise a pair of springs 49a, 49b, coiled around each shaft 31, in substantially end to end relation and preferably between the bars 29, 30, their inner ends engaging a pin 51 on the shaft and their outer ends extending through openings 52 formed in the bars 29, 30, and bent over the walls thereof to provide a connection for such ends. In this arrangement it will be seen that the springs around each shaft 31 are capable of acting in opposite directions thereon, so that when the adjacent device 19 is swung in either direction the springs will be tensioned and hence return the device to its mid or normal position when the force acting thereon ceases.

The yielding locking means 50 consists of a substantially spherical cavity 52′ formed in the lower surface of a plate 52a (one plate 52a being secured to each bar 28) and adapted to receive a portion of a ball 53 acted upon by an expansion spring 54 which is mounted in a recess 55 formed in the hub of the adjacent device 19. As shown in Fig. 4, the major portion of the ball 53 sets within the open end of the recess 55 and is normally pressed into the cavity by the spring 54 and through its engagement with the walls of the cavity and recess locks the device 19 in its mid position; but when a force sufficient to overcome the spring acts on the device, the ball will recede into the recess and allow the device to swing laterally.

The load engaging member 20 and the carrying devices 19 are adapted for handling loads of varying shapes, and sizes, including crates and boxes, as well as sheet material, such as sheet metal plates, in packs or piles whether they are crated or tied into bundle form or loose. The clamping means 47 is particularly advantageous for use where the sheets are loose as it prevents any or all thereof from being jounced off the carrying devices 19.

The clamping means 47 comprises a pair of spaced rockers 56 disposed inwardly of the plates 21a, 22a, and each trunnioned on a shaft 57. The outer portion of each shaft 57 is supported in aligned openings formed in the adjacent plates 21—21a or 22—22a. The outer ends of the rockers 56 are connected by a rod or shaft 58 on which is pivoted a clamping member 59, engageable with the upper surface of the load, as shown in Fig. 1; the inner ends of the rockers 56 receive the bifurcated ends of clevises 60 mounted on or secured to the free ends of the cables 44, a pin 60a extending through aligned openings in the bifurcations and rocker end to pivotally secure them together (see Figs. 3 and 5).

Each of the rockers 56 carries an outwardly extending arm 61 on which loosely fits a sleeve member 62 provided on its upper portion with a boss 62a. The boss 62a is formed with a threaded recess 63 into which is threaded a rod 64.

The rod 64 extends upwardly through an enlarged opening 65 formed in a supporting member 66 and carries at its upper end a collar 67 held thereon by a nut 68 threaded on the rod. The supporting member 66 may comprise an angle fixed to the adjacent channel section 21'. Between the supporting member 66 and collar 67 I mount an expansion spring 69, coiled around the rod 64 and normally acting through the rod 64, sleeve 62 and arm 61 to swing the adjacent rocker upwardly to the position shown in dotted lines in Figs. 1 and 4, in which position the devices 19 may be projected below a load or removed from beneath it. The springs 69 are preferably of such strength that they will maintain the rockers 56 lifted at their outer ends when the elevating member 20 is being raised and lowered without a load on it, but when the weight of the member 20 is increased, as by a load, the springs 69 will yield and permit the pull of the cables to swing the rockers and effect a clamping of the load as the pull is continued to raise, lower or support the elevating member in elevated position.

Referring to Figs. 7, 8 and 9, the inner plates 21a, 22a, are cut away, as shown at 70 to provide clearance for a pair of transverse guides, 71, 71a, and a pair of supports 72, 72a, slidably mounted thereon. The guides 71, 71a, are suitably supported at their opposite ends by the plates 21, 22.

Each of the supports 72, 72a, is provided with hollow bosses 73 through which the guides 71, 71a extend and permit the supports to slide transversely to adjust them to any desired spaced relation. Each support is also provided with three horizontal walls 28a, 29a, 30a, (which correspond to the walls 28, 29, 30, respectively, in the form of construction shown in Figs. 1 to 6, inclusive) and these walls are formed with aligned openings to rotatably receive the shaft 31a (see Fig. 8). The shaft 31a is supported on the plate 30a in a manner previously described and carries at its lower end the load carrying device 19a. As shown, the return means 49a' for returning the device 19a to its mid-position when swung laterally is similar to the return means 49 already described and the spring locking means 50a is similar to the spring locking means 50 already referred to, except that it is located forward of the shaft 31a.

73' indicates collars surrounding one of the guides—for example, guide 71, and adjustable thereon, being fixed in its adjusted position by set screw 74. The collars may comprise semi-circular segments held together by cap screws 75. The collars 73' limit movements of the supports 73 inwardly and the plates 21, 22, limit their movement outwardly.

Means, indicated as an entirety at 75', are provided for moving the supports transversely on the guides 71, 71a, and preferably these means are arranged to move them toward or from each other simultaneously.

The means 75' comprise a rod 76 rotatably supported in and extending through openings 77 formed in the plates 21, 22, and nuts 78 each secured to the adjacent support 73 and threaded on the rod 76. As shown, the threads 76a on the outer portions of the rod have opposite pitch, so rotation of the rod in one direction will move the nuts 78 and through them the supports toward each other and rotation of the rod in the other direction will move these parts away from each other. Each free end of the rod 76 is shaped to receive a suitable tool or device to effect its rotation. Each support is cut away to provide clearance for the rod 76 and these cutaways are recessed to engage the sides of the nut to hold it against lateral movement and a transverse wall 78' is provided to cooperate with the wall 29a to engage opposite faces of the nut to prevent its turning.

From the foregoing description, it will be understood that the load carrying devices 19a are swingable laterally in either direction on the supports 72 and that the latter may be adjusted to more effectively engage and carry loads or according to the spacing and arrangement of the dunnage used in connection therewith.

The constructions herein disclosed are advantageous where the truck is being manipulated in restricted areas. For example, in turning curves should either or both carrying devices 19 (Figs. 1 to 6) or 19a (Figs. 7 to 9) engage a wall or obstruction, or by reason of the engagement with the latter the device making the engagement swings laterally and engages the other device, it or they will swing laterally thus permitting the turning movement to be completed without damaging the truck or the wall or obstruction; where the devices 19 or 19a are carrying a load and the load engages the wall or obstruction, the load will swing both devices laterally and thus ride past the wall or obstruction.

Fig. 2 illustrates another condition where my form of construction may be used advantageously. In this view, A indicates a driveway at one side of a wall B and having a dock or platform C on which a load is to be discharged. The elevating member with its load has been engaged and lifted to a position higher than the dock C and driven into position with the load above the latter and then lowered for the purpose of discharging the load on the dock; this view illustrates in full lines this latter operation, the load being omitted but the dunnage D therefor with the load carrying devices between then being shown. Due to the restricted area in the aisle A, the truck cannot be driven endwise in the direction of the arrow x, but it may be steered laterally (as shown by the dotted line positions) and in doing so, the devices 19 will be swung laterally about their respective shafts 31, due to their engagement with the dunnage D, and thus permit the discharge of the load and driving away of the truck.

No claim is made herein to the construction of load carrying member and automatic load clamping means as that forms the subject-matter of an application filed March 22, 1926, by Edward H. Remde, of Cleveland, Ohio, Ser. No. 96,550 (see Letters Patent No. 1,843,735, dated February 2, 1932).

79 indicates a suitable limit switch mechanism, the movable element of which is connected by a rod 80 to one arm of a lever 81 fulcrumed on a shaft mounted on one of the brackets 39. The other arm of the lever is connected to a rod 82 guided at its lower end by the walls of an opening formed in a plate or bar 83, fixed to a part of the housing 7. The rod 82 carries adjustable tappets 84, one of which is engaged by a portion of the elevating member 20 when moving in either direction, whereby the motor 43 is cut out when the elevating member reaches or approaches a predetermined position.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a wheel mounted frame, means for steering certain of the wheels for supporting said frame, a member mounted on said frame for vertical movement, and a plurality of load carrying devices projecting outwardly beyond the front end of said frame and arranged to be projected below a load whereby it may be lifted, and means for independently pivoting said devices at their inner ends on said member, whereby the outer ends of said devices may independently swing laterally in either direction in a horizontal plane.

2. In apparatus of the class described, the combination of a wheel supported frame, means for steering certain of the wheels for supporting said frame, a load supporting member having a projecting portion, means for supporting said portion on said member to swing laterally in either direction, and a yieldable locking means normally locking said portion in mid position.

3. In apparatus of the class described, the combination of a wheel supported frame, means for steering certain of the wheels for supporting said frame, a load supporting member having a projecting portion adapted to be projected below a load whereby it may be lifted, means for supporting said portion at its inner end on said member to permit its outer end to swing laterally in a horizontal plane in either direction, and means normally tending to return said portion to its mid position when moved in either direction.

4. In apparatus of the class described, the combination of a wheel supported frame, means for steering certain of the wheels for supporting said frame, a load supporting member having a projecting portion, means for supporting said portion on said member to swing laterally in either direction, means normally tending to return said portion to its mid position when moved in either direction, and a yieldable locking means normally locking said portion in mid position.

5. In apparatus of the class described, the combination of a wheel mounted frame, a pair of supporting members disposed near one end of said frame, means for suporting each of said members for adjustment transversely of said frame, load carrying devices projecting outwardly from said supporting members and arranged to be projected below a load whereby it may be lifted, and means for pivotally supporting each of said devices at its inner end on the adjacent supporting member, whereby the outer end of said device is swingable laterally in a horizontal plane in either direction.

6. In apparatus of the class described, the combination of a wheel mounted frame, a plurality of spaced load carrying devices disposed horizontally and projecting outwardly for supporting a load and arranged to be projected below a load whereby it may be lifted, and means for pivotally and slidably supporting the inner end of each of said devices, whereby its free or outer end may swing laterally in a horizontal plane in either direction and said device bodily adjusted transversely of said frame.

7. In apparatus of the class described, the combination of a wheel mounted frame, a guide disposed substantially vertically and mounted on said frame adjacent its front end, an elevating member slidably engaging said guide, means for raising and lowering said elevating member, and a load carrying device extending outwardly beyond said frame for projection below a load whereby the latter may be raised, said device being pivotally connected at its inner end on said elevating member to swing laterally in a horizontal plane about a vertical axis.

8. In apparatus of the class described, the combination of a wheel mounted frame, a guide disposed substantially vertically and mounted on said frame adjacent its front end, an elevating member slidably engaging said guide, means for raising and lowering said elevating member, and a plurality of spaced load carrying devices extending outwardly beyond said frame for projection below a load whereby the latter may be raised, each said device being pivotally connected at its inner end to said elevating member on a vertical axis to swing in a horizontal plane independently of the remaining devices.

9. In apparatus of the class described, the combination of a wheel mounted frame, a guide thereon, an elevating member slidably engaging said guide, means for raising and lowering said elevating member, a plurality of spaced load carrying devices projecting outwardly from said member and each pivotally connected at its inner end thereto to swing laterally in either direction, and yieldable means for locking each of said devices in its mid position.

10. In apparatus of the class described, the combination of a wheel mounted frame, a guide thereon, an elevating member slidably engaging said guide, means for raising and lowering said elevating member, a plurality of spaced load carrying devices projecting outwardly from said member and each pivotally connected at its inner end thereto to swing lateraly in either direction, means tending to return each of said devices to its mid position when moved laterally, and yieldable means for locking each of said devices in its mid position.

11. In apparatus of the class described, the combination of a wheel mounted frame, a guide thereon, an elevating member slidably engaging said guide, means for raising and lowering said elevating member, a plurality of spaced load carrying devices projecting outwardly from said member, each pivotally connected at its inner end thereto, whereby the outer end of said device may swing laterally in a horizontal plane independently of the remaining devices, in either direction, and means tending to return each of said devices to its mid position when moved laterally.

12. In apparatus of the class described, the combination of a wheel mounted frame, a guide thereon, an elevating member slidably engaging said guide, means for raising and lowering said elevating member, a plurality of spaced load carrying devices projecting outwardly from said member and arranged to be projected below a load, whereby it may be lifted, and means for pivotally and slidably supporting each said device at its inner end on said elevating member to permit the outer end of said device to swing laterally in either direction horizontally.

13. In apparatus of the class described, the combination of a wheel mounted frame, a guide thereon, an elevating member slidably engaging said guide, means for raising and lowering said elevating member, a plurality of spaced load carrying devices projecting outwardly from said member and arranged to be projected below a load, whereby it may be lifted, means for pivotally and slidably supporting each said device at its inner end on said elevating member to permit the outer end of said device to swing laterally in either direction horizontally, and means for sliding said supporting means transversely of said frame.

14. In apparatus of the class described, the combination of a wheel mounted frame, a guide thereon, an elevating member slidably engaging said guide, means for raising and lowering said elevating member, a transversely extending guide carried by said elevating member, supporting members slidably mounted on said guide, a vertically disposed shaft rotatably mounted in each of said supporting members, and a load carrying device connected to each of said shafts.

15. In apparatus of the class described, the combination of a wheel supported frame, a guide thereon, an elevating member slidably engaging said guide, means for raising and lowering said member, a load carrying device projecting outwardly from and pivotally mounted on said member to swing about a vertical axis, and a yieldable locking means between said device and said member for normally locking said device in its outwardly projecting position.

16. In apparatus of the class described, the combination of a wheel supported frame, a guide thereon, an elevating member slidably engaging said guide, means for raising and lowering said member, a load carrying device projecting outwardly from and pivotally mounted on said member to swing about a vertical axis, laterally in either direction, and means normally tending to return said device to its outwardly projecting position when swung in either direction.

17. In apparatus of the class described, the combination of a wheel supported frame, a guide thereon, an elevating member slidably engaging said guide, means for raising and lowering said member, a load carrying device projecting outwardly from and pivotally mounted on said member to swing about a vertical axis, laterally in either direction, means normally tending to return said device to its outwardly projecting position when swung in either direction, and a yieldable locking means between said device and said member for normally locking said device in its outwardly projecting position.

18. In apparatus of the class described, the combination of a wheel mounted frame, a guide thereon disposed adjacent one end of said frame, an elevating member slidably engaging said guide, means for raising and lowering said member, a vertically disposed shaft rotatably mounted on said member, a load engaging member fixed to said shaft and arranged to extend outwardly therefrom for projection below a load, whereby the latter may be lifted, and said device may swing laterally in a horizontal plane, and a spring between said shaft and said load engaging member normally tending to maintain said device in its outwardly extended position.

In testimony whereof, I have hereunto subscribed my name.

FRANK STONER.